(12) United States Patent
Fisher et al.

(10) Patent No.: US 7,068,764 B1
(45) Date of Patent: Jun. 27, 2006

(54) V.90 OVER ALL-DIGITAL CONNECTIONS

(75) Inventors: Abraham Fisher, Haifa (IL); Oren Somekh, Emek-Israel (IL)

(73) Assignee: Surf Communication Solutions Ltd., Yokneam (IL)

( * ) Notice: Subject to any disclaimer, the term of this patent is extended or adjusted under 35 U.S.C. 154(b) by 0 days.

(21) Appl. No.: 10/220,179

(22) PCT Filed: Mar. 29, 2000

(86) PCT No.: PCT/IL00/00198

§ 371 (c)(1),
(2), (4) Date: Aug. 27, 2002

(87) PCT Pub. No.: WO01/74047

PCT Pub. Date: Oct. 4, 2001

(51) Int. Cl.
*H04M 11/00* (2006.01)

(52) U.S. Cl. .................... 379/93.01; 379/93.31
(58) Field of Classification Search .......... 379/93.01, 379/93.08, 93.28, 93.31, 93.32, 90.01; 375/222; 370/352
See application file for complete search history.

(56) References Cited

U.S. PATENT DOCUMENTS

| 5,267,300 A | 11/1993 | Kao et al. | |
| 6,034,992 A | 3/2000 | Miron et al. | |
| 6,480,533 B1 * | 11/2002 | Chu et al. | 375/222 |
| 6,567,463 B1 * | 5/2003 | Nicholas | 375/222 |

FOREIGN PATENT DOCUMENTS

WO   WO 00/07353   2/2000

OTHER PUBLICATIONS

Surf Communicationsolutions Ltd.; "Surf Introduces Patented Modem Technologies for Modern Telephony Infrastructure Equipment Manufacturers;" Jun. 4, 2001; Surf News & Events, Online!; XP002203971; Retrieved from the Internet: <http://www.surf-com.com/pr_20010604.html>retrieved on Jun. 28, 2002.

(Continued)

*Primary Examiner*—Stella Woo
(74) *Attorney, Agent, or Firm*—Fenster & Company

(57) ABSTRACT

A method of forming a V.90 connection on an all digital connection. The method includes transmitting a request to connect from a digitally connected client modem (28) to a digitally connected server modem (24) and transmitting, by the client modem (28) to the server modem, a message requesting to form a V.90 connection, identifying the digitally connected client modem (28) as an analog connected modem.

18 Claims, 4 Drawing Sheets

OTHER PUBLICATIONS

ITU-T Telecommunication Standardization Sector of ITU; "Series V: Data Communication Over the Telephone Network-Simultaneous Transmission of Data and Other Signals;" "A Digital Modem and Analogue Modem Pair for Use on the Public Switched Telephone Network (PSTN) at Data Signalling Rates of up to 56,000 Bits/s Downstream and up to 33,600 Bits/s Upstream;" Sep. 1998; International Telecommunication Union (ITU) V.90; pp. 1-50.

ITU-T Telecommunication Standardization Sector of ITU; "Series V: Data Communication Over the Telephone Network-Simultaneous Transmission of Data and Other Signals;" "A Digital Modem Operating at Data Signalling Rates of up to 64 000 Bits/s for Use on a 4-Wire Circuit Switched Connection and on Leased Point-to-Point 4-Wire Digital Circuits;" May 1999; International Telecommunication Union; ITU-T Recommendation V.91.

ITU—Telecommunication Standardization Sector; "V.92 Draft with Proposed Changes;" V.92 Editor; PCM-00-062R1.

ITU-T Telecommunication Standardization Sector of ITU; "Series V: Data Communication Over the Telephone Network-Interfaces and Voiceband Modems;" "A Modem Operating at Data Signalling Rates of up to 33 600 Bits/s for Use on the General Switched Telephone Network and on Leased Point-to-Point 2-Wire Telephone-Type Circuits;" Feb. 1998; International Telecommunication Union; ITU-T Recommendation V.34.

* cited by examiner

V.90 OVER ALL-DIGITAL CONNECTIONS

RELATED APPLICATIONS

The present application is a U.S. national application of PCT/IL00/00198, filed on Mar. 29, 2000.

FIELD OF THE INVENTION

The present invention relates to communication systems and in particular to modems.

BACKGROUND OF THE INVENTION

Modems are used for transmitting data over communication links. Generally, two modems on opposite ends of a communication link send each other data by converting the data into electrical signals suitable for transmission on the link. In order to allow modems of different vendors to transmit data to each other, standards have been defined stating exactly how the signals should be modulated. These standards include, for example, the V.34 standard which allows transmission on both analog and digital links, the V.90 standard which is defined for connections between clients connected to analog lines, such as home users, and servers connected to digital lines (e.g., T1/E1 lines), such as Internet service providers, and the V.91 standard which is meant for pure digital connections.

The V.34 standard is described in "A modem operating at data signalling rates of up to 33 600 bit/s for use on the general switched telephone network and on leased point-to-point 2-wire telephone-type circuits", ITU-T Recommendation V.34, 2/98, the disclosure of which is incorporated herein by reference.

The V.90 standard is described in "A digital modem and analogue modem pair for use on the public switched telephone network (PSTN) at data signalling rates of up to 56 000 bit/s downstream and up to 33 600 bit/s upstream", ITU-T Recommendation V.90, 9/98, the disclosure of which is incorporated herein by reference.

The V.91 standard is described in "A digital modem operating at data signalling rates of up to 64 000 bit/s for use on a 4-wire circuit switched connection and on leased point-to-point 4-wire digital circuits", ITU-T Recommendation V.91, 5/99, the disclosure of which is incorporated herein by reference.

The V.34 standard allows transmission rates of up to 33.6 Kbps in both directions. The V.90 standard allows transmission at a rate of up to 56 Kbps in one direction (referred to as the downstream direction) and 33.6 Kbps in the other direction. The V.91 standard allows transmission at 64 Kbps in both directions. The V.91 standard, however, is relatively new and it is expected to take many years, if at all, until most of the modems in the market implement the V.91 standard.

Usually modems implement a plurality of different standards. Generally, when two modems form a connection they search for a highest transmission rate standard which they both implement and use this standard for transmission over the connection. The search for a common transmission standard is usually performed in accordance with the V.8 standard.

FIG. 1 is a schematic illustration of a V.90 connection as is known in the art. A client modem 12, connected to a public switching telephone network (PSTN) 19 through analog lines 14, forms a connection with a server modem 24 which is connected to PSTN 19 through a digital link 32. Usually, modem 24 belongs to a modem pool, for example of an Internet service provider (ISP) 29. Generally, a line card 16 translates the signals from analog lines 14 to a digital link 36 of PSTN 19, and vice versa. It is noted, that in most cases, except for analog lines 14 which connect line card 16 and client modem 12, PSTN 19 is formed of substantially only digital links, represented in FIG. 1 by a digital network 23.

Client modem 12 comprises a signal processing unit 13 and a sampler and reconstructer 15 which turns digital signals into analog signals for transmission and analog signals from lines 14 into digital signals. When a computer 10 requests to a connection to ISP 29, client modem 12 forms a negotiation V.8 connection with server modem 24. During the negotiation connection, client modem 12 identifies as an analog modem and server modem 24 identifies as a digital modem such that the modems agree to use a V.90 connection for transmission of data. Thereafter, modems 12 and 24, sequentially as defined by the V.90 protocol, transmit test signals used to check the characteristics of links 14 and 32.

After the tests are concluded, modems 12 and 24 move into transceiving states according to the V.90 standard. Signals transmitted from computer 10, are prepared for transmission by processing unit 13 of modem 12 at a rate of up to 33.6 Kbps and are then converted to analog signals by a D/A of sampler and reconstructer 15. Signals transmitted by server modem 24 are transmitted from the modem at a rate of up to 56 Kbps as described above. The transmitted signals from server modem 24 are converted to analog signals by line card 16 and are passed on link 14 to modem 12. An A/D of sampler and reconstructer 15 of modem 12 samples the analog signals at a high enough rate which allows proper operation of the modem, i.e., proper synchronization of a clock of sampler and reconstructer 15 in receiving modem 12 to the timing of transmitting modem 24. Generally, to allow for rate correction, the A/D of sampler and reconstructer 15 samples the signals at a rate higher than 8000 samples per second. The sampled digital signals are then passed to processing unit 13 for processing.

FIG. 2 is a schematic block diagram of an exemplary receiving path 40 of processing unit 13 of modem 12, as is known in the art. Path 40 receives samples from sampler and reconstructer 15 on a line 42. The samples are added to correction values provided by an echo canceller 44 and are then filtered by a channel filter 46. The filtered samples are passed to a timing recovery unit 48 and a rate converter 50, which correct for timing drifts of the received samples. The samples are passed through an automatic gain control (AGC) unit 52 and are then provided to an equalizer 54 which corrects phase and amplitude distortions of the received samples. The samples from equalizer 54 are passed to a symbol decision module 56 which determines for each sample which symbol it represents. Symbol decision module 56 also detects attenuation pad impairments and performs robbed bit signaling (RBS) in order to better perform the determination of the samples which represent the symbols. The symbols are then passed through a symbol to bit converter 58 which translates the symbols into bits, and through a descrambler 60 which descrambles the bits.

The definition of the V.90 connection is such that it can only be established between an analog connected client (as most client modems are home modems connected through analog wires to the public switching telephone network (PSTN)) and a digitally connected server modem (as most server modems belong to ISPs which are connected digitally to the PSTN). In recent years, many computers connect to ISPs through all-digital connections, for example, using cellular phone connections which are entirely digital. Until the V.91 protocol is widely implemented, these computers must use, at most, the V.34 protocol which provides a maximal transmission rate of 33.6 Kbps in both the upstream and downstream.

SUMMARY OF THE INVENTION

An aspect of some preferred embodiments of the present invention relates to a method of establishing a V.90 connection between two modems connected over digital lines. The signals sent from a first one of the modems are changed such that the second modem thinks the first modem is connected through analog wires and agrees to form a V.90 connection. No changes are made to the second modem or to the signals transmitted from the second modem.

In a preferred embodiment of the present invention, the first modem does not perform steps required for handling analog signals usually performed in receiving downstream V.90 signals. Rather, the signals from the digital connection preferably enter the first modem through a bypass which leads directly to a symbol decision module.

There is therefore provided in accordance with a preferred embodiment of the present invention, a method of forming a V.90 connection on an all digital connection, including transmitting a request to connect from a digitally connected client modem to a digitally connected server modem, and transmitting, by the client modem to the server modem, a message requesting to form a V.90 connection, identifying the digitally connected client modem as an analog connected modem.

Preferably, the method includes forming a negotiation connection between the client modem and the server modem responsive to the request to connect and transmitting the message requesting to form a V.90 connection includes transmitting during the negotiation connection.

Preferably, the client modem does not perform, during the negotiation connection, tests required to determine analog connection parameters. Alternatively, the client modem disregards results of tests required to determine analog connection parameters.

Preferably, the method includes receiving, by the client modem, symbols transmitted in accordance with the V.90 connection, and passing the received symbols to a symbol decision module of the client modem which determines which signals are represented by the symbols, immediately upon receiving the signals by the modem.

There is further provided in accordance with a preferred embodiment of the present invention, a method of receiving downstream signals transmitted from a server modem to a client modem in accordance with the V.90 standard, including receiving the transmitted signals by the client modem, deciding which symbols are represented by the received signals, immediately upon receiving the signals by the client modem, and converting the decided symbols into bits.

Preferably, receiving the transmitted signals includes receiving digital samples. Preferably, receiving the transmitted signals includes receiving samples at a rate of 8000 samples per second. Preferably, deciding immediately upon receiving the signals includes deciding without performing echo cancellation, automatic gain control, rate conversion and/or channel filtering.

There is further provided in accordance with a preferred embodiment of the present invention, a V.90 supporting modem, including an input from a digital trunk line which receives signals transmitted in accordance with the V.90 standard, and a digital interpretation unit which receives samples directly from the input from the digital trunk line.

Preferably, the digital interpretation unit is connected directly to the digital trunk line. Preferably, the digital interpretation unit includes a symbol decision module which receives samples directly from the input from the digital trunk line. Preferably, the symbol decision module is connected directly to the digital trunk line. Preferably, the input from the digital trunk line receives symbols at a rate of 8000 symbols per second.

BRIEF DESCRIPTION OF FIGURES

The invention will be more clearly understood by reference to the following description of preferred embodiments thereof in conjunction with the figures, in which.

DETAILED DESCRIPTION OF THE PREFERRED EMBODIMENTS

Figure 3:
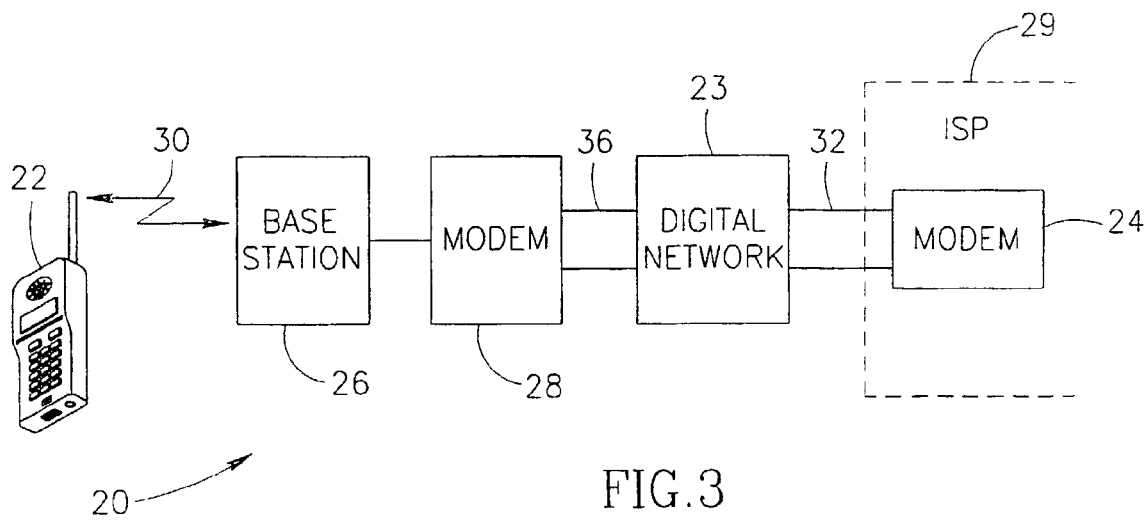
FIG. 3 is a schematic illustration of a V.90 connection, in accordance with a preferred embodiment of the present invention.

FIG. 3 is a schematic illustration of a connection 20 which may operate using the V.90 standard, in accordance with a preferred embodiment of the present invention. A mobile unit 22, such as a wireless access protocol (WAP) unit, forms a communication connection with a server modem 24 (usually belonging to a modem pool) of an Internet service provider (ISP) 29. It is noted that although FIG. 3 shows formation of a digital connection between ISP 29 and a mobile unit 22, the present invention is not limited to any specific digital connection. For example, a computer may connect to client modem 28 through an ISDN connection instead of through cellular link 30. The signals transmitted and received by mobile unit 22 are preferably passed over a cellular link 30 to and from a base station 26 of a cellular company. Preferably, the signals to and from mobile unit 22 are passed through a client modem 28 (also generally belonging to a modem pool) associated with base station 26 or with another base station of the cellular company. Modem 28 is connected to modem 24 through a digital network 23 which is preferably formed only of digital links, such as E1 or T1 links. Digital network 23 may belong to a private or public communication network, such as PSTN 19 (FIG. 1), and/or may comprise a plurality of concatenated data links or may be formed of a single link. Modems 28 and 24 preferably connect to digital network 23 through digital lines 36 and 32, respectively.

Figure 4:
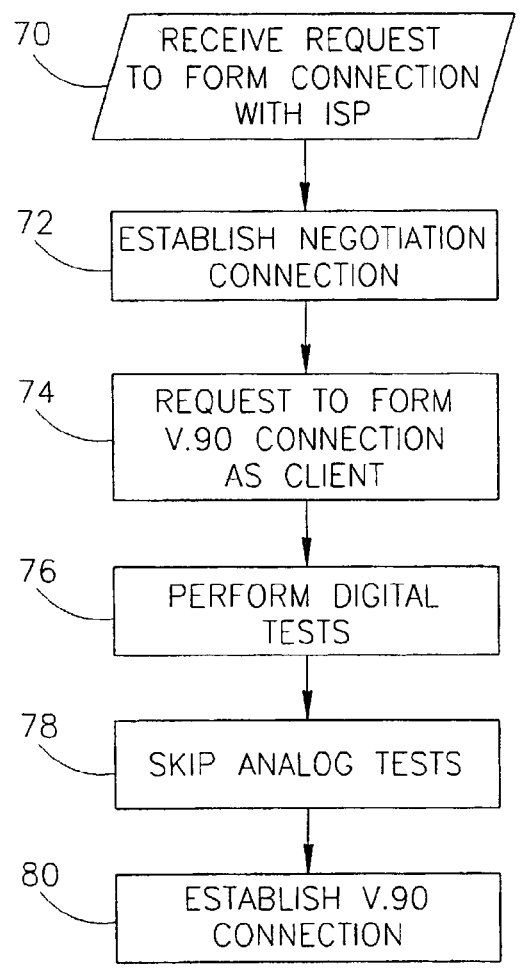
FIG. 4 is a flowchart of the actions performed by a V.90 modem in forming an all digital connection, in accordance with a preferred embodiment of the present invention.

FIG. 4 is a flowchart of the actions performed by modem 28 in forming an all-digital connection between mobile unit 22 and ISP 29, in accordance with a preferred embodiment of the present invention. Upon receiving (70) a request to form a connection with ISP 29 from mobile unit 22, modem 28 preferably establishes (72) a V.8 negotiation connection with server modem 24 of ISP 29. During the negotiations of the V.8 connection, client modem 28 requests (74) to form a connection using the V.90 standard identifying itself as an analog (i.e., client) modem. Upon agreement of server modem 24, tests are performed (76) in order to evaluate the quality of link 32 and/or to determine parameters of the connection, as is known in the art. In a preferred embodiment of the present invention, client modem 28 skips (78) those tests required to determine analog connection parameters and/or to evaluate analog lines. Alternatively, client modem 28 performs the tests, so that server modem 24 does not realize that client modem 28 is not analog connected, but discards the results. Thereafter, a V.90 connection (80) is established.

In the V.90 connection, signals transmitted from modem 28 to modem 24, i.e., in the upstream direction, are preferably transmitted, as is known in the art, at a rate of up to 33.6 Kbps in accordance with the V.90 and V.34 standards which are identical regarding the upstream transmission. Any changes in the transmission required due to the fact that modem 28 is connected directly through digital link 32, are performed in accordance with the digital transmission of the V.34 standard. For example, modem 28 preferably does not convert the transmitted signals to analog signals as client modem 28 is connected through a digital connection.

Preferably, no changes are made in the way server modem 24 receives the upstream signals, as the upstream signals are transmitted by client modem 28 substantially without changes. Further preferably, no changes are made in the way server modem 24 transmits signals. Thus, no changes are required in server modem 24 of ISP 29 which preferably does not know that client modem 28 is actually connected directly to digital link 32 (or to a digital network).

Figure 1:
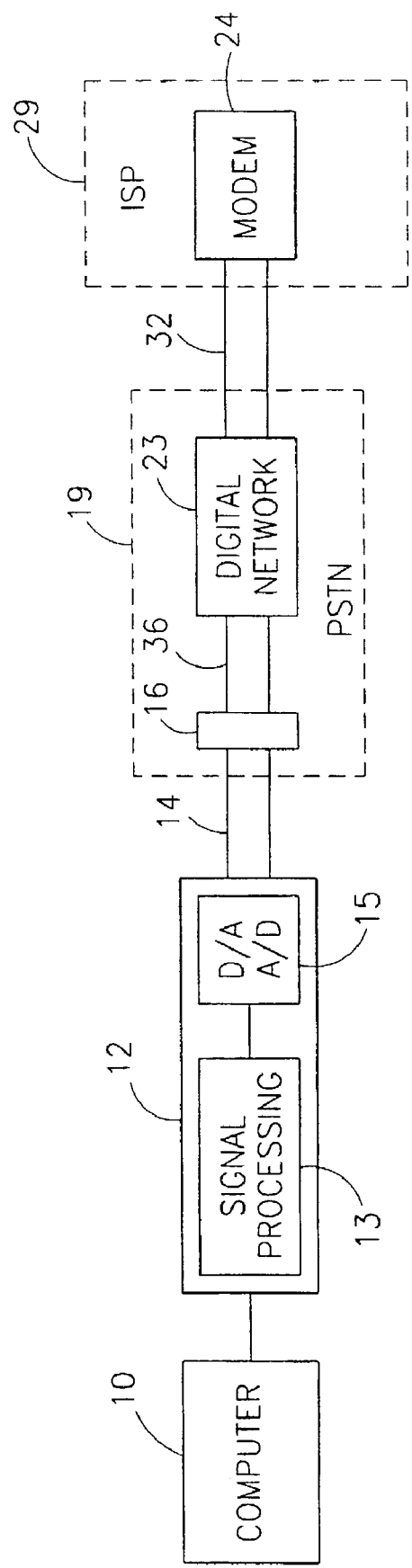
FIG. 1 is a schematic illustration of a V.90 connection as is known in the art.

Referring back to FIG. 2, it is noted that receiving path 40 may be viewed as formed of two major parts. A first part, an analog to digital conditioning unit, comprises units 44, 46, 48, 50, 52 and 54. The analog to digital conditioning unit brings the analog signals received on line 42 substantially back to the state at which they were before the conversion performed by line card 16 (FIG. 1). A second part, a digital interpretation unit, comprises units 56, 58 and 60. The digital interpretation unit translates the digital signals provided by the analog to digital conditioning unit into a form tangible by computer 10.

Figure 2:
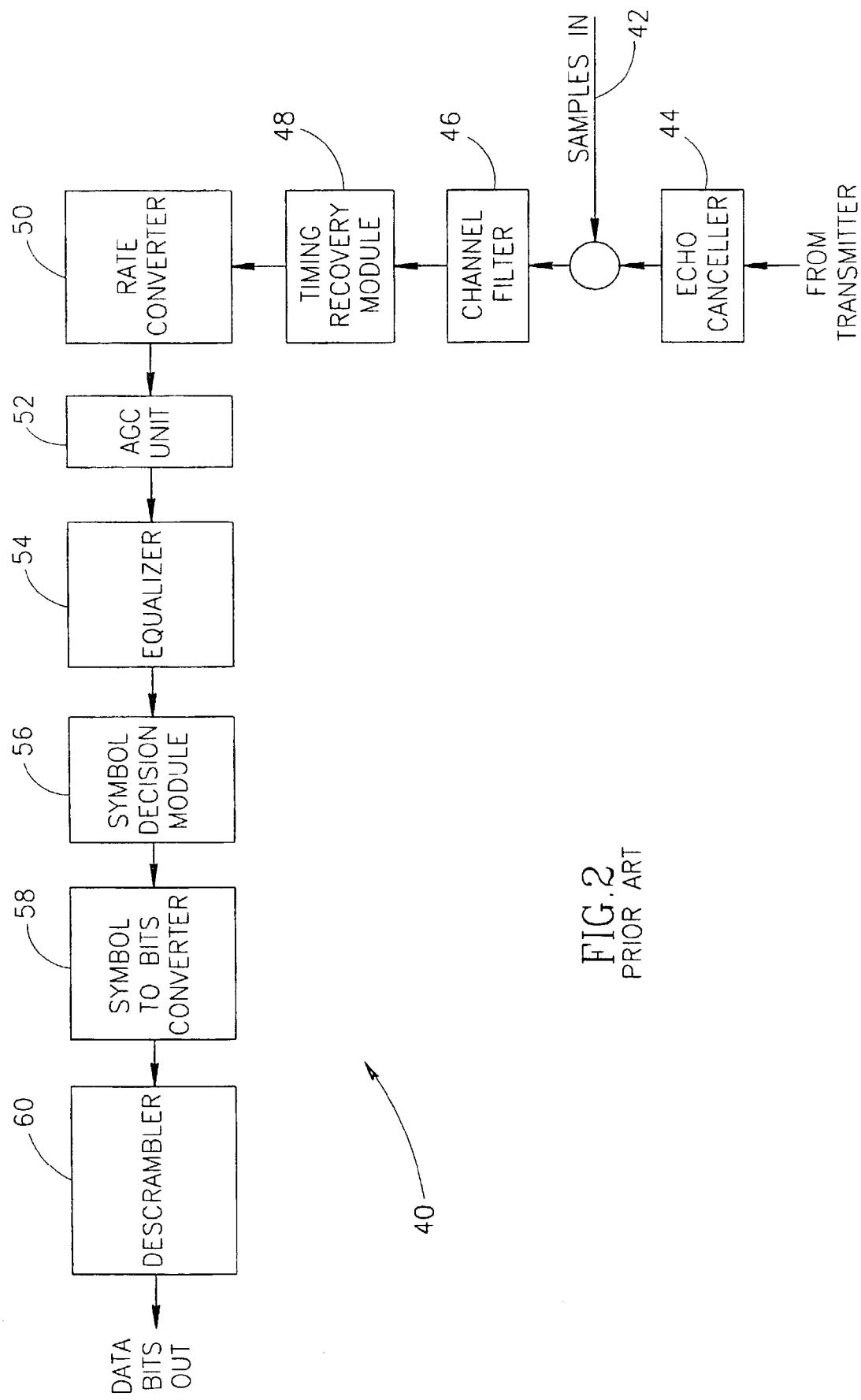
FIG. 2 is a schematic block diagram of an exemplary receiving path of a V.90 modem, as is known in the art.
Figure 5:
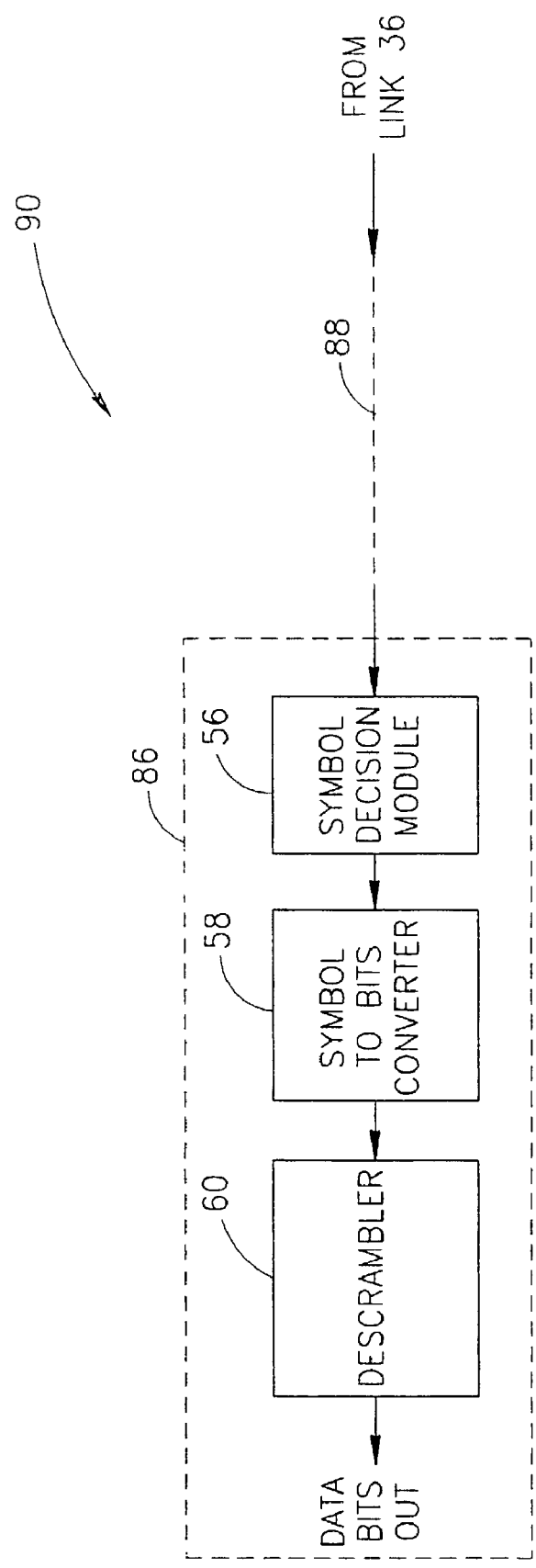
FIG. 5 is a schematic block diagram of a receiving path of a V.90 modem, in accordance with a preferred embodiment of the present invention.

FIG. 5 is a schematic block diagram of a receiving path 90 of modem 28, in accordance with a preferred embodiment of the present invention. Preferably, modem 28 receives digital signals on an input line 88 and passes the digital signals directly to a digital interpretation unit 86. Preferably, the digital signals received on input line 88 are passed directly to symbol decision module 56 of digital interpretation unit 86. Preferably, symbol decision module 56 performs detection of attenuation pad impairments and robbed bit signaling (RBS) in addition to determining the samples which represent the symbols. As the downstream digital signals from ISP modem 24 were not converted by a line card 16 (FIG. 1) to analog signals, modem 28 preferably does not perform the tasks of the analog to digital conditioning unit of path 40, i.e., modem 28 does not perform echo cancellation (44, FIG. 2), and does not pass the signals through channel filter 46, timing recovery module 48, rate converter 50, AGC unit 52 and equalizer 54 (FIG. 2).

It is noted that in some preferred embodiments of the invention some or all of the elements of modems 28 and 100 shown in FIG. 5 are implemented in software on one or more processors.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of preferred embodiments thereof that are provided by way of example and are not intended to limit the scope of the invention. It should be understood that features described with respect to one embodiment may be used with other embodiments and that not all embodiments of the invention have all of the features shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to." The scope of the invention is limited only by the following claims:

The invention claimed is:

1. A method of forming a connection on an all digital connection, comprising:
    transmitting a request to connect from a digitally connected client modem to a digitally connected server modem; and
    transmitting, by the client modem to the server modem, a message requesting to form a connection in accordance with a digital to analog protocol, identifying the digitally connected client modem as an analog connected modem.

2. A method according to claim 1, comprising forming a negotiation connection between the client modem and the server modem responsive to the request to connect and wherein transmitting the message requesting to form a connection comprises transmitting during the negotiation connection.

3. A method according to claim 2, wherein the client modem does not perform, during the negotiation connection, tests required to determine analog connection parameters.

4. A method according to claim 2, wherein the client modem disregards results of tests required to determine analog connection parameters.

5. A method according to claim 1, comprising receiving, by the client modem, symbols transmitted in accordance with the connection in accordance with a digital to analog protocol, and passing the received symbols to a symbol decision module of the client modem which determines which signals are represented by the symbols, immediately upon receiving the signals by the modem.

6. A method according to claim 1, wherein the server modem does not know that the client modem is digitally connected.

7. A method of receiving downstream signals, comprising:
    exchanging control signals between a server modem and a client modem;
    determining by the client and server modems to establish a digital to analog V.90 standard connection, responsive to the exchanged control signals;
    transmitting downstream signals from the server modem to the client modem in accordance with the V.90 standard,
    receiving the transmitted signals by the client modem;
    deciding which symbols are represented by the received signals, immediately upon receiving the signals by the client modem; and
    converting the decided symbols into bits.

8. A method according to claim 7, wherein receiving the transmitted signals comprises receiving digital samples.

9. A method according to claim 7, wherein receiving the transmitted signals comprises receiving samples at a rate of 8000 samples per second.

10. A method according to claim 7, wherein deciding immediately upon receiving the signals comprises deciding without performing echo cancellation.

11. A method according to claim 7, wherein deciding immediately upon receiving the signals comprises deciding without performing automatic gain control.

12. A method according to claim 7, wherein deciding immediately upon receiving the signals comprises deciding without performing rate conversion.

13. A method according to claim 7, wherein deciding immediately upon receiving the signals comprises deciding without performing channel filtering.

14. A V.90 supporting modem, comprising:
 an input from a digital trunk line which receives signals transmitted in accordance with the V.90 standard;
 a negotiation unit adapted to select a protocol for signal reception on a connection; and
 a digital interpretation unit which receives samples directly from the input from the digital trunk line, when the negotiation unit determines that a digital to analog V.90 connection is to be established.

15. A modem according to claim 14, wherein the digital interpretation unit is connected directly to the digital trunk line.

16. A modem according to claim 14, wherein the digital interpretation unit comprises a symbol decision module which receives samples directly from the input from the digital trunk line.

17. A modem according to claim 16, wherein the symbol decision module is connected directly to the digital trunk line.

18. A modem according to claim 14, wherein the input from the digital trunk line receives symbols at a rate of 8000 symbols per second.

* * * * *